United States Patent
Iwano et al.

(10) Patent No.: US 12,483,087 B2
(45) Date of Patent: Nov. 25, 2025

(54) ROTARY ELECTRICAL MACHINE

(71) Applicant: Hitachi, Ltd., Tokyo (JP)

(72) Inventors: Ryuuichirou Iwano, Tokyo (JP);
Tetsuya Suto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 185 days.

(21) Appl. No.: 18/289,410

(22) PCT Filed: May 17, 2022

(86) PCT No.: PCT/JP2022/020486
§ 371 (c)(1),
(2) Date: Nov. 3, 2023

(87) PCT Pub. No.: WO2022/255084
PCT Pub. Date: Dec. 8, 2022

(65) Prior Publication Data
US 2024/0097525 A1  Mar. 21, 2024

(30) Foreign Application Priority Data

Jun. 4, 2021 (JP) .................................. 2021-093988

(51) Int. Cl.
*H02K 5/20* (2006.01)
*H02K 9/19* (2006.01)

(52) U.S. Cl.
CPC .............. *H02K 5/203* (2021.01); *H02K 9/19* (2013.01)

(58) Field of Classification Search
CPC .................................. H02K 5/203; H02K 9/19
See application file for complete search history.

(56) References Cited

U.S. PATENT DOCUMENTS

| | | |
|---|---|---|
| 6,515,384 B1 | 2/2003 | Kikuchi et al. |
| 10,790,726 B2 * | 9/2020 | Diemunsch .............. H02K 9/06 |
| 2019/0260267 A1 | 8/2019 | Diemunsch |

FOREIGN PATENT DOCUMENTS

| | | |
|---|---|---|
| JP | 08-111964 A | 4/1996 |
| JP | 10-234157 A | 9/1998 |
| JP | 2001-145302 A | 5/2001 |
| JP | 2006-005990 A | 1/2006 |
| JP | 2019-530424 A | 10/2019 |

OTHER PUBLICATIONS

International Search Report of PCT/JP2022/020486 dated Aug. 2, 2022.

* cited by examiner

*Primary Examiner* — Sean Gugger
(74) *Attorney, Agent, or Firm* — MATTINGLY & MALUR, PC (57) ABSTRACT

A stator of a rotary electrical machine includes a stator core, a coil, and at least one of a connection wire and a jumper wire. The coil has a first coil end which is located on one end side of the stator core in the axial direction and a second coil end which is located on the other end side of the stator core in the axial direction. A coolant flow path for cooling the rotor and the stator has: a coolant inflow port; a first annular flow path which faces an air gap in the axial direction; a relay flow path which is provided on the second coil end side and which faces the air gap in the axial direction; and a second annular flow path which is in communication with the relay flow path and which is provided as shifted radially outward with respect to the air gap.

7 Claims, 5 Drawing Sheets

ROTARY ELECTRICAL MACHINE

TECHNICAL FIELD

The present invention relates to cooling of a rotary electrical machine.

BACKGROUND ART

In the fields of automobiles and aircraft, coils and cores of motors need to be cooled, and cooling structures for the cooling are provided. In recent years, for electrification of automobiles and aircraft, the high power density of motors has advanced, and further improvement in cooling performance has been required.

As a background art of the present invention, a motor cooler described in JP 2001-145302 A (PTL 1) is known. In the motor cooler of PTL 1, an annular oil jacket communicating with both ends of a stator of a motor is provided, and a refrigerant flow channel is formed in an axial direction in a stator slot to directly cool a winding wire of the stator (see Abstract).

CITATION LIST

Patent Literature

PTL 1: JP 2001-145302 A

SUMMARY OF INVENTION

Technical Problem

Heat dissipation of the winding wire in the stator of the rotary electrical machine has the following problems.

For example, in an inner rotor type rotary electrical machine, when a rectangular wire is wound by using a winding wire, it is necessary to draw out a connection wire connecting a wound coil and an external device such as an inverter to the outside of a motor. In the case of a direct liquid-cooled rotary electrical machine, it is effective to increase a flow rate to improve a heat transfer coefficient in order to improve cooling performance. However, when a high-speed liquid refrigerant is applied to the connection wire, flow oscillation due to an unsteady fluid force is generated, and thus a problem in structural strength may be caused. This is because a coil end portion is tightly wound around a stator core, is generally fixed with varnish or the like, and is firmly fixed and supported, whereas the connection wire is not supported as described above.

As described above, when a refrigerant flow rate is increased in order to improve cooling performance, there is a possibility that a problem of reliability in terms of structural strength will arise. On the other hand, when the refrigerant flow rate is decreased in order to suppress flow oscillation, cooling performance cannot be improved. Consequently, in the structure of the related art, it is difficult to both ensure reliability in terms of the structural strength and improve the cooling performance.

In the motor cooler of PTL 1, improvement in the cooling performance by direct liquid cooling is taken into consideration. The present invention proposes a rotary electrical machine in which, when a refrigerant flow rate is increased in order to further improve the cooling performance, the cooling performance can be improved without lowering reliability.

That is, an object of the present invention is to provide a rotary electrical machine that can improve cooling performance without impairing reliability in structural strength.

Solution to Problem

In order to achieve the above object, the present invention is configured as follows.

There is provided a rotary electrical machine including: a rotor; a stator facing the rotor via a predetermined air gap; and a flow channel through which a refrigerant for cooling the rotor and the stator flows. The stator has a stator core having a plurality of slots in a circumferential direction, a plurality of coils arranged in the slots in a circumferential direction of the stator core, and at least one of a connection wire connecting an external device and the coils and a jumper wire connecting the coils adjacent to each other in the circumferential direction. The coils have a first coil end projecting from the slot on one end side in an axial direction of the stator core and a second coil end projecting from the slot on the other end side of the stator core in the axial direction. The flow channel has a refrigerant inflow port disposed on a side of the first coil end, a first annular flow channel that extends in the circumferential direction in communication with the refrigerant inflow port and faces the air gap in an axial direction, a relay flow channel that is disposed on a side of the second coil end and faces the air gap in the axial direction, and a second annular flow channel that extends in the circumferential direction in communication with the relay flow channel and is disposed to be shifted outward in a radial direction with respect to the air gap. The connection wire or the jumper wire included in the coil is disposed in the first annular flow channel.

Advantageous Effects of Invention

According to the present invention, the flow oscillation can be suppressed without deterioration of the cooling performance of a connection wire side coil end, and both the enhancement of the reliability in terms of the structural strength and the improvement of the cooling performance can be realized by increasing the refrigerant flow rate of a connection wire opposite-side coil end to improve the cooling performance.

Problems, configurations, and effects other than those described above will be clarified by the following descriptions of embodiments.

DESCRIPTION OF EMBODIMENTS

Hereinafter, examples of a rotary electrical machine according to the present invention will be described with reference to the drawings. The same reference signs are assigned to the same configurations in the drawings or the examples, and the redundant description thereof will be omitted. In addition, in a case where the same configuration assigned the same reference sign has a different part, the description thereof will be provided every time.

Example 1

(Configuration of Rotary Electrical Machine)

Figure 1:
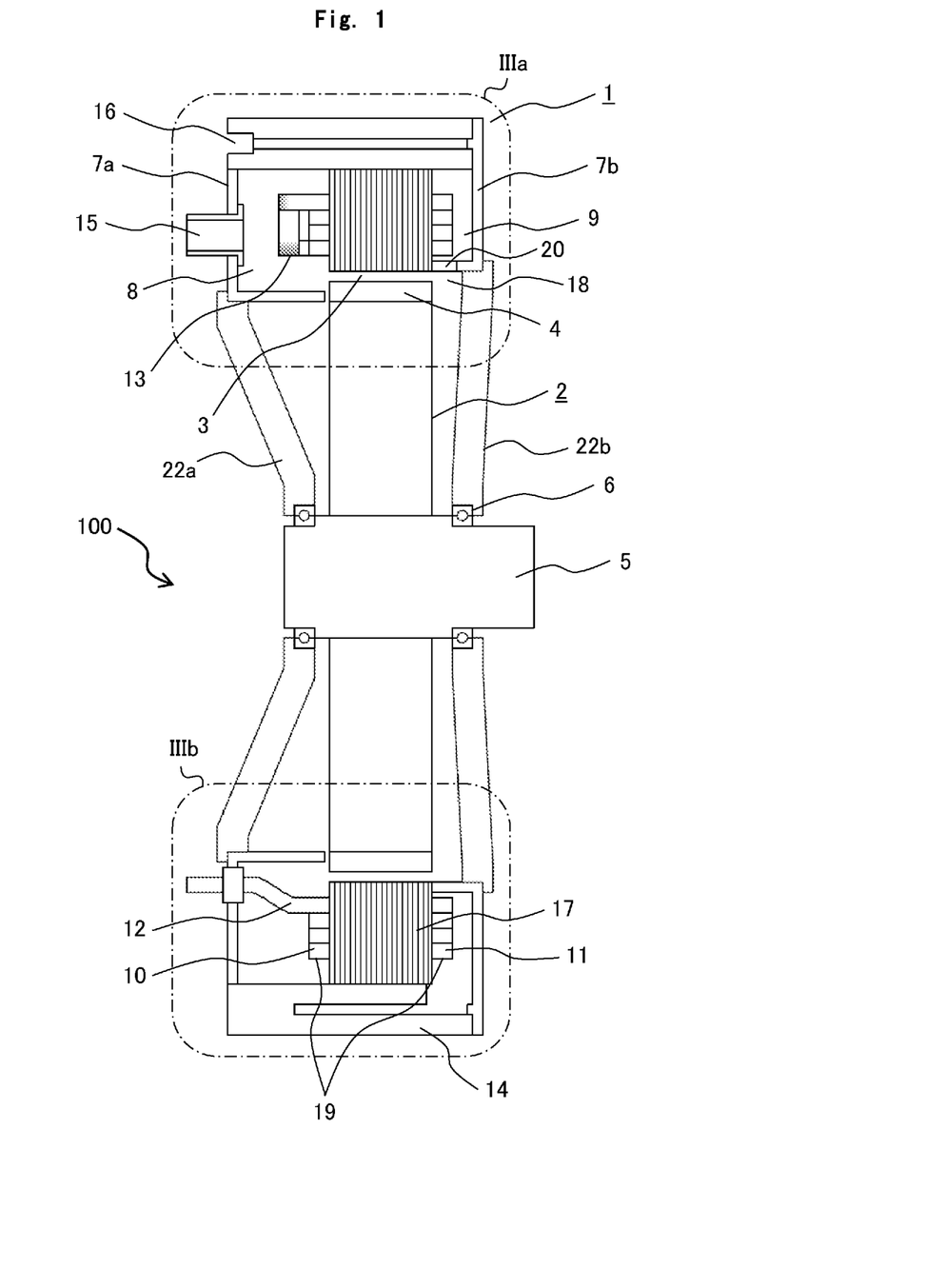
FIG. 1 is a cross-sectional view of a rotary electrical machine according to a first example of the present invention.
Figure 2:
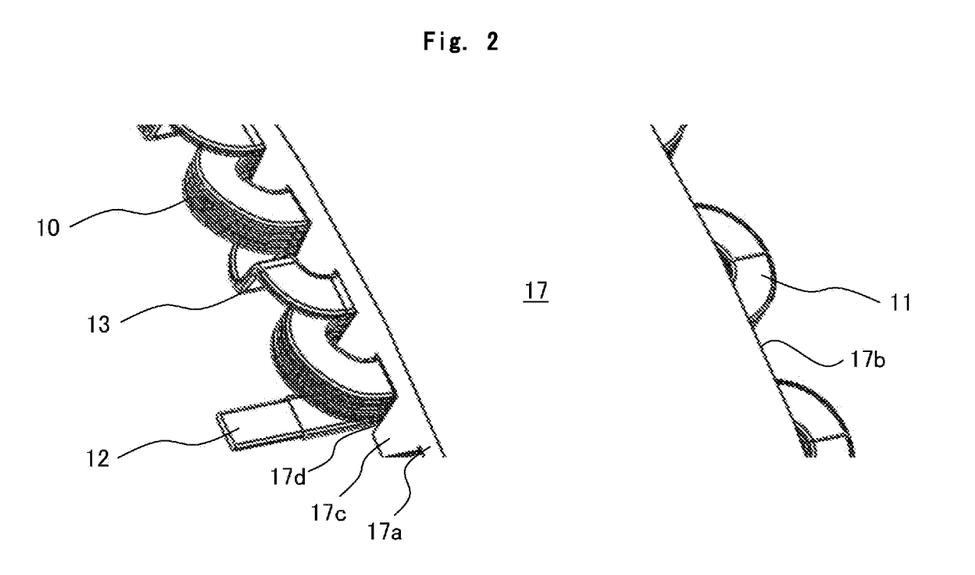
FIG. 2 is a perspective view of a stator core and a winding coil of a rotary electrical machine to which the present invention is applied, when viewed from a connection wire side.

FIG. 1 is a cross-sectional view of a rotary electrical machine 100 according to a first example of the present invention. A perspective view illustrates a stator core 17 and a winding coil 19 of the rotary electrical machine 100 to which the present invention is applied, when viewed from a connection wire 12 side.

The rotary electrical machine 100 to which Example 1 is applied will be described with reference to FIGS. 1 and 2.

FIG. 1 illustrates an inner rotor type rotary electrical machine 100 in which a stator 1 is disposed on an outer diameter side of the rotary electrical machine and a rotor 2 having a permanent magnet 4 is disposed on the inner diameter side. The stator 1 and the rotor 2 face each other in a radial direction of the rotary electrical machine 100 via an air gap 3. In the rotary electrical machine 100 of the present example, a bracket that encloses the stator 1 and the rotor 2 is configured to include housings 7a and 7b, end plates 22a and 22b, and a cooling jacket 14.

The rotor 2 has a shaft 5 serving as a rotary shaft, and a plurality of permanent magnets 4 are arranged in a circumferential direction. In addition, the rotor 2 is rotatably supported by bearings 6 held by the first end plate 22a and the second end plate 22b. Hereinafter, a direction along a rotation axis of the shaft 5 will be referred to as an "axial direction" in the description.

The stator core 17 has a plurality of teeth 17c that are provided to project inward in a radial direction, and slots 17d are formed between two adjacent teeth 17c. Accordingly, the coil 19 is wound around the plurality of slots 17d. The coil 19 wound around the stator core 17 has a connection wire 12 for connecting the coil to an external device (not illustrated) such as an inverter, on one end (end face 17a) side of the stator core 17 in the axial direction. The coil end 10 on the side where the connection wire 12 is disposed is covered with the housing 7a and forms a first annular flow channel 8 extending in a circumferential direction of the stator core 17. Hereinafter, the coil end 10 on the side where the connection wire 12 is disposed (the side of the end face 17a of the stator core 17) will be referred to as a "first coil end", and a coil end 11 on a side opposite to the side where the connection wire 12 is disposed (a side of an end surface 17b of the stator core 17) will be referred to as a "second coil end" in the description.

The first annular flow channel 8 extends inward (inner diameter side) from the air gap 3 in the radial direction, and the first annular flow channel 8 and the air gap 3 are formed to face each other in the axial direction. That is, one end side (first coil end 10 side) of the air gap 3 in the axial direction is connected to the first annular flow channel 8, and the air gap 3 communicates with the first annular flow channel 8.

On the other end side of the stator core 17 in the axial direction, a second annular flow channel 9 is formed by the housing 7b to cover the second coil end 11. The second annular flow channel is formed to be shifted outward from the air gap 3 in the radial direction (outer diameter side).

A relay flow channel 18 is formed on the other end side of the stator core 17 at a position facing the air gap 3 in the axial direction, and the relay flow channel 18 and the second annular flow channel 9 are connected at least partially in the circumferential direction. That is, a refrigerant flow channel 18 is formed between the second end plate 22b and the rotor 2, the refrigerant flow channel 18 serves as the relay flow channel, the other end side (the second coil end 11 side) of the air gap 3 in the axial direction is connected to the second annular flow channel 9, and the air gap 3 communicates with the second annular flow channel 9. In order to allow the relay flow channel 18 and the second annular flow channel 9 to communicate with each other, the housing 7b has a communication hole as a connection portion 20 at at least a part thereof in the circumferential direction.

(Flow of Refrigerant of Rotary Electrical Machine)

Next, the flow of the refrigerant in the present example will be described with reference to FIG. 3.

Figure 3:
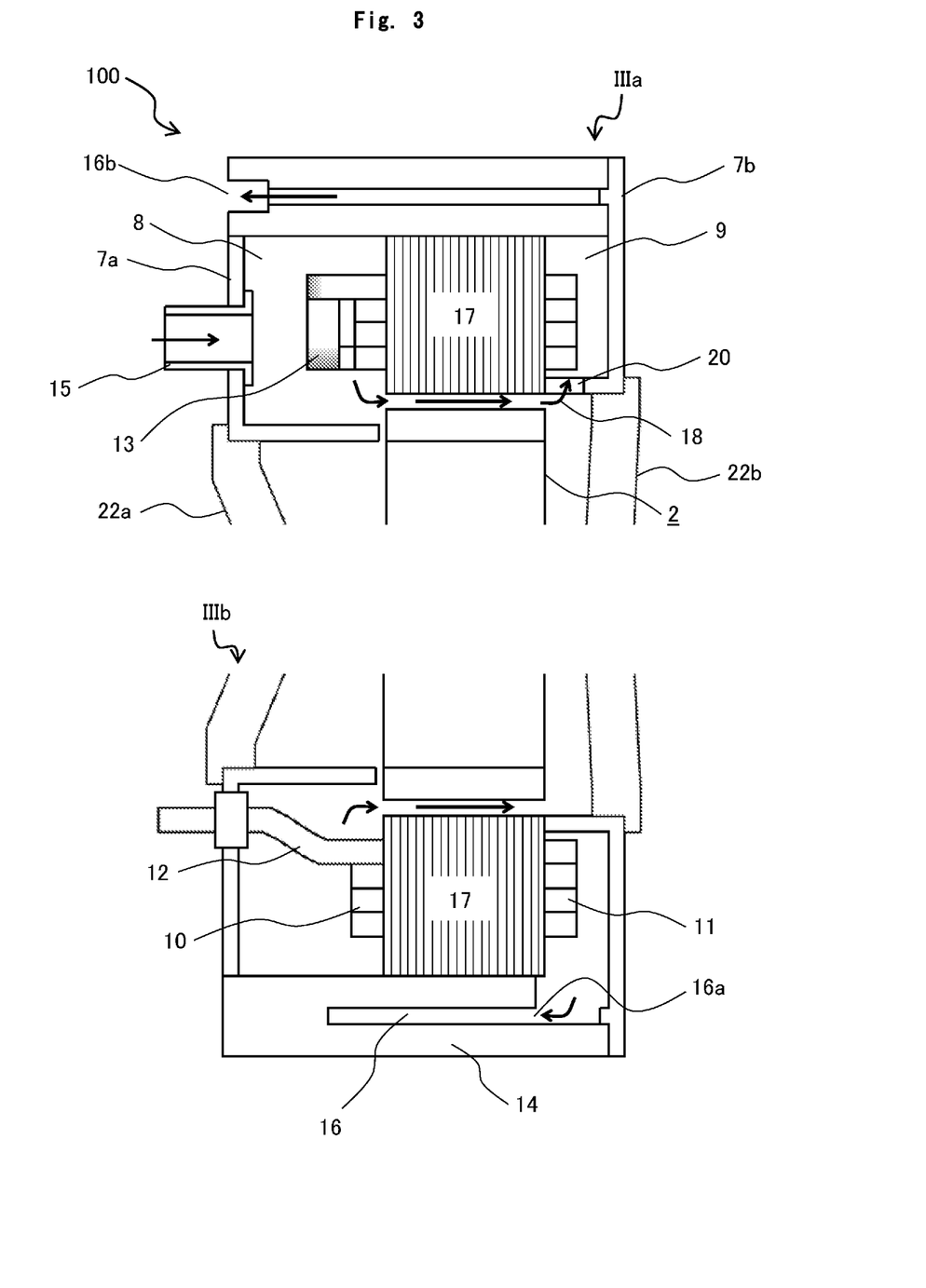
FIG. 3 is an explanatory view of a flow of a refrigerant according to the first example of the present invention.

FIG. 3 is an explanatory view of the flow of the refrigerant according to the first example of the present invention. FIG. 3 is an enlarged view of an upper portion (IIIa portion) and a lower portion (IIIb portion) in FIG. 1, and arrows in the drawings represent flows of a refrigerant.

The refrigerant flows from a refrigerant inflow port 15 into the first annular flow channel 8 of the rotary electrical machine. The refrigerant having flowed into the first annular flow channel 8 flows into the air gap 3 from the entire circumference of the air gap 3 facing in the axial direction while the refrigerant expands in the circumferential direction. That is, in the present example, the air gap 3 serves as a flow channel through which the refrigerant flows.

The refrigerant having flowed into the air gap 3 flows into the relay flow channel 18 and flows outward from the connection portion 20 in the radial direction into the second annular flow channel 9.

The rotary electrical machine 100 of the present example includes a cooling jacket 14 which encloses the stator 1 on an outer circumference of the stator 1 and in which a flow channel allowing a refrigerant to flow is formed. The connection portion 20 is provided at one position (upper portion in FIG. 3) in the circumferential direction, and the refrigerant flowing into the second annular flow channel 9 flows halfway through the second annular flow channel 9 in the circumferential direction and then flows into the cooling jacket 14 from below. An inlet of the cooling jacket 14 through which the refrigerant flows into the cooling jacket 14 is provided at one position (lower portion in FIG. 3) in the circumferential direction. The refrigerant in the cooling jacket 14 flows halfway through the cooling jacket 14 in the circumferential direction and returns to the upper portion, and then flows outside the rotary electrical machine 100 through a refrigerant outflow port 16b.

That is, in the rotary electrical machine 100 of the present example, the refrigerant inlet (connection portion 10) to the second annular flow channel 9 is provided at one position in the circumferential direction. On the other hand, an inlet 16a of a refrigerant flow channel 16 formed in the cooling jacket 14 is provided on a radially opposite side of the refrigerant inlet 10 to the second annular flow channel 9 with a rotary shaft of the rotor 2 interposed between the inlet and the refrigerant inlet. A flow channel is formed to allow the refrigerant that has flowed into the second annular flow channel 9 to flow halfway through the second annular flow channel 9 in the circumferential direction, then flow from the inlet 16*a* into the refrigerant flow channel 16 of the cooling jacket 14, and flow outside the rotary electrical machine 100 after flowing halfway through the refrigerant flow channel 16 of the cooling jacket 14 in the circumferential direction.

In the present example, an outer circumferential side of the housing 7*b* has a structure that also serves as the cooling jacket. The cooling jacket 14 is not essential and is provided to enhance the cooling effect of the coil 19 by cooling the stator core 17 from an outer circumferential side thereof. Needless to say, the present invention can be applied even in a case where the cooling jacket 14 is not provided.

According to the present example, since the refrigerant flows in the axial direction from the entire circumference of the air gap 3, a large opening area of the air gap 3 serving as the refrigerant flow channel can be obtained. Therefore, the refrigerant is divided to flow into the first annular flow channel 8 and the air gap 3, so that a flow rate of the refrigerant flowing through the first annular flow channel 8 decreases. Therefore, the flow oscillation of the connection wire 12 due to the unsteady fluid force is suppressed, and the reliability in terms of the structural strength can be ensured. In addition, since a low-temperature refrigerant first flows into the first annular flow channel 8, it is possible to suppress a decrease in cooling performance of the first coil end 10.

On the other hand, in the second annular flow channel 9 in which the connection wire 12 is not laid out, the entire refrigerant divided to flow into the first annular flow channel 8 and the air gap 3 flows in the circumferential direction, so that the flow rate of the refrigerant increases, and a heat transfer coefficient increases. Consequently, the cooling performance of the second coil end 11 can be improved. In addition, since the second coil end 11 is tightly wound around the stator core 17 and is generally fixed with varnish or the like, there is no concern that flow oscillation will occur.

As described above, the flow oscillation can be suppressed without deterioration of the cooling performance on a side of the connection wire-side coil end (first coil end) 10 on the connection wire 12 side, and both the enhancement of the reliability in terms of the structural strength and the improvement of the cooling performance can be realized by increasing the refrigerant flow rate on a side of the connection wire opposite-side coil end (second coil end) 11 on the opposite side of the connection wire 12 side to improve the cooling performance.

In order to firmly fix and support the connection wire 12, fastening the connection wire 12 with a string-like insulation member or fixing the connection wire with varnish is not desirable because a surface of the connection wire 12 is covered with an insulation material having poor thermal conductivity, and thus the cooling performance deteriorates. In the present example, since the flow rate of the refrigerant flowing through the first annular flow channel 8 decreases, and the flow oscillation of the connection wire 12 is suppressed, it is also possible not to provide a fixing structure in which the connection wire 12 is fastened with a string-like insulating member or is fixed with varnish.

Example 2

In Example 1, the structure for suppressing the generation of the flow oscillation of the connection wire 12 has been exemplified.

Other than the connection wire 12, a jumper wire 13 connecting the adjacent coils is also a portion having relatively weak fixing support, and it is possible to both ensure reliability and improve the cooling performance by the same method as the connection wire 12 described in Example 1.

That is, the jumper wire 13 connecting the adjacent coils 19, the first coil end 10 on one end side of the stator core 17 in the axial direction where the jumper wire 13 is disposed, and the second coil end 11 on the other end side of the stator core 17 are provided, and the refrigerant flow channel includes the refrigerant inflow port 15 disposed on the first coil end 10 side, the first annular flow channel 8 that is connected to the refrigerant inflow port 15 and faces substantially the entire circumference of the air gap 3 in the axial direction, the relay flow channel 18 that is disposed on the second coil end 11 side and faces the air gap 3 in the axial direction, and the second annular flow channel 9 that is connected to the relay flow channel 18 and is disposed to be shifted from the air gap 3 in the radial direction of the stator 1.

Regarding the flow of the refrigerant, the flow is similar except that the connection wire 12 of Example 1 is replaced with the jumper wire 13, and thus the description thereof will be omitted.

According to the structure described above, the flow oscillation can be suppressed without deterioration of the cooling performance of the jumper wire side coil end 10, and both the enhancement of the reliability in terms of the structural strength and the improvement of the cooling performance can be realized by increasing the refrigerant flow rate of the jumper wire opposite-side coil end 11 to improve the cooling performance.

That is, the rotary electrical machines 100 of Examples 1 and 2 have the following configurations.

The rotary electrical machine 100 includes the rotor 2, the stator 1 facing the rotor 2 via the predetermined air gap 3, and a flow channel (refrigerant flow channel) through which the refrigerant for cooling the rotor 2 and the stator 1 flows. The stator 1 has the stator core 17 having the plurality of slots 17*d* in the circumferential direction, the plurality of coils 19 arranged in the slots 17*d* in a circumferential direction of the stator core 17, and at least one of the connection wire 12 connecting an external device and the coils 19 and the jumper wire 13 connecting the coils 19 adjacent to each other in the circumferential direction. The coils 19 have the first coil end 10 projecting from the slot 17*d* on one end side in the axial direction of the stator core 17 and the second coil end 11 projecting from the slot 17*d* on the other end side of the stator core 17 in the axial direction. The flow channel has the refrigerant inflow port 15 disposed on the side of the first coil end 10, the first annular flow channel 8 that extends in the circumferential direction in communication with the refrigerant inflow port 15 and faces the air gap 3 in the axial direction, the relay flow channel 18 that is disposed on the side of the second coil end 11 and faces the air gap 3 in the axial direction, and the second annular flow channel 9 that extends in the circumferential direction in communication with the relay flow channel 18 and is disposed to be shifted outward in a radial direction with respect to the air gap 3. Accordingly, the connection wire 12 or the jumper wire 13 of the coil 19 is disposed in the first annular flow channel 8.

In this case, the refrigerant flows through the flow channel in the order of the refrigerant inflow port 15, the first annular flow channel 8, the air gap 3, the relay flow channel 18, and the second annular flow channel 9 to cool the rotor 2 and the stator 1.

Here, the first annular flow channel 8 and the relay flow channel 18 may be connected to the air gap 3 to face the air gap 3 in the axial direction on the entire circumference of the air gap 3. Consequently, the refrigerant can smoothly flow into the air gap 3, and the flow rate of the refrigerant flowing through the first annular flow channel 8 can be favorably reduced.

In general, the jumper wire 13 and the connection wire 12 are not necessarily arranged on the same side of the stator core 17 in the axial direction, but it is desirable to arrange both the wires on the same side. That is, it is desirable that the coil 19 have both the connection wire 12 and the jumper wire 13, and the connection wire 12 and the jumper wire 13 be disposed in the first annular flow channel 8. Consequently, the structures of Examples 1 and 2 can be simultaneously satisfied, and the reliability in terms of the structural strength of both the jumper wire 13 and the connection wire 12 can be ensured.

Example 3

Figure 4:
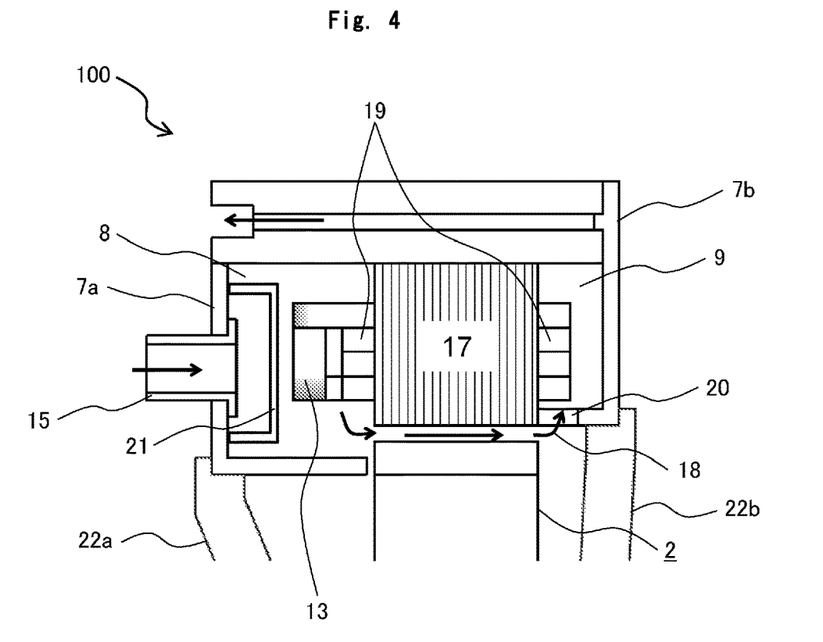
FIG. 4 is a cross-sectional view illustrating a part of a rotary electrical machine according to a third example of the present invention.

FIG. 4 is a cross-sectional view illustrating a part of the rotary electrical machine 100 according to a third example of the present invention. FIG. 4 is an enlarged view of a portion corresponding to an upper portion (IIIa portion) of FIG. 1 according to the first example, and arrows in the drawing represent flow of the refrigerant.

In FIG. 4, a baffle plate 21 for turning the flow of the refrigerant in the circumferential direction is disposed on an outlet side of the refrigerant inflow port 15. That is, the rotary electrical machine 100 of the present example includes the baffle plate 21 for deflecting the flow of the refrigerant in the circumferential direction at an outlet portion of the refrigerant inflow port 15 to the first annular flow channel 8. Consequently, it is possible to prevent a rapid flow from the refrigerant inflow port 15 from directly hitting the connection wire 12 and the jumper wire 13.

As shown in FIG. 2, since the connection wire 12 and the jumper wire 13 are arranged at intervals in the circumferential direction, it is possible to prevent the flow from the refrigerant inflow port 15 from directly hitting the connection wire 12 and the jumper wire 13, by appropriately shifting the positions of the connection wire 12 and the jumper wire 13 in the circumferential direction with respect to the refrigerant inflow port 15 generally. However, even in a case where the arrangement described above cannot be made due to structural constraints, according to the structure as in the present example, the flow oscillation of the connection wire 12 and the jumper wire 13 can be suppressed, and both enhancement in reliability and improvement of the cooling performance can be achieved.

Example 4

The refrigerant inflow port 15 is provided at one position in the circumferential direction in each of the above examples, but may be provided at a plurality of positions in the circumferential direction. That is, a plurality of refrigerant inflow ports 15 may be arranged in the circumferential direction.

According to the structure described above, the flow rate of the refrigerant flowing from the refrigerant inflow port 15 can decrease, and even if the refrigerant directly hits the connection wire 12 or the jumper wire 13, the generation of the flow oscillation can be suppressed.

In addition, in a case where the refrigerant inflow port 15 is provided at one position, a flow rate in the circumferential direction is generated more or less when the inflowing refrigerant is distributed in the circumferential direction. However, the plurality of refrigerant inflow ports 15 can decrease the circumferential flow rate, and the possibility of the flow oscillation of the connection wire 12 and the jumper wire 13 can be further reduced.

As described above, each example is merely an example, and the present invention is not limited to these details as long as the features of the invention are not impaired. For example, although the present invention is described with reference to the inner rotor type rotary electrical machine 100 in the examples, the present invention can be similarly applied to an outer rotor type rotary electrical machine.

Example 5

An example (fifth example) of an electric wheel 1000 will be described with reference to FIGS. 5 and 6. In the present example, an example using an outer rotor type rotary electrical machine 100 is described, and the present invention applied to the inner rotor type rotary electrical machine 100 described above is applied to the outer rotor type rotary electrical machine 100.

Figure 5:
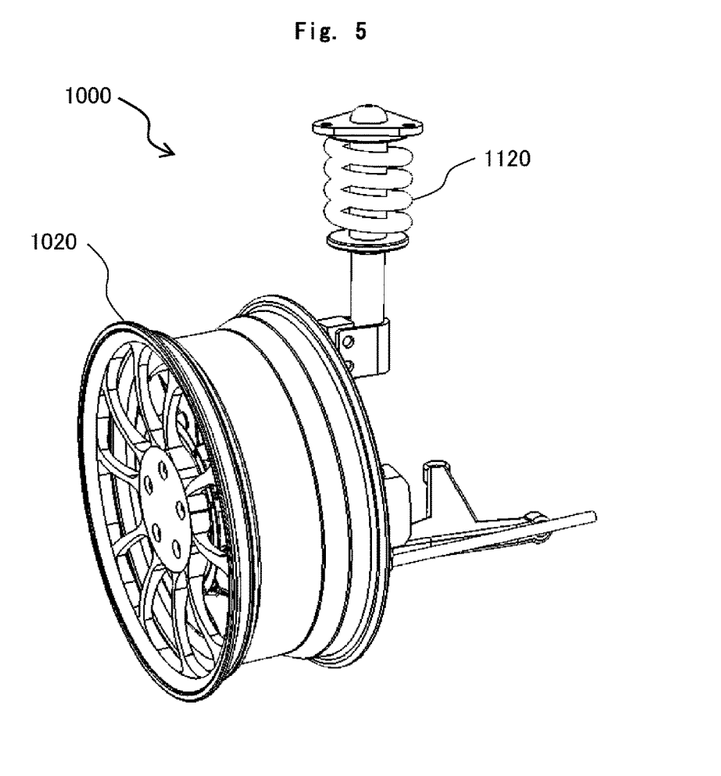
FIG. 5 is a view according to the present invention and is a perspective view illustrating the external appearance of an outer rotor type electric wheel 1000.
Figure 6:
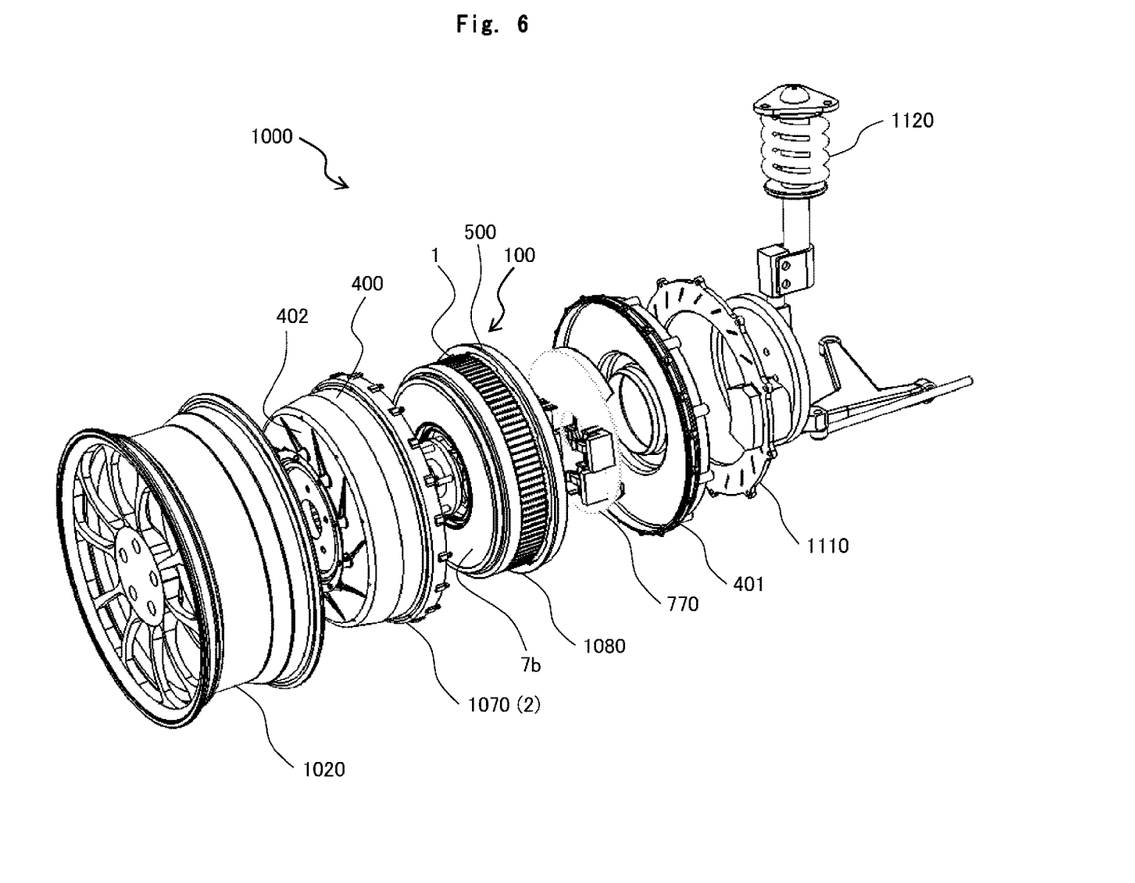
FIG. 6 is an exploded three-dimensional view illustrating the electric wheel 1000 of FIG. 5 disassembled on a rotation axis.

FIG. 5 is a view according to the present invention and is a perspective view illustrating the external appearance of the outer rotor type electric wheel 1000. FIG. 6 is an exploded three-dimensional view illustrating the electric wheel 1000 of FIG. 5 disassembled on a rotation axis.

Since an xEV drive motor requires high torque, it is necessary to apply a large current to the coil (motor winding wire) 19. Since the coil 19 (see FIG. 1) of the present example uses a flat rectangular wire having a long side and a short side in a cross section thereof, a space factor in the slots can improve, and conductor resistance can be suppressed such that a copper loss can be reduced.

The electric wheel 1000 includes a wheel 1020, a rotor assembly 1070, a stator assembly 1080, a power converter 770, and a first case portion 401. The rotor assembly 1070 includes a rotor 2, a rotor case 400, and a second case portion 402. The stator assembly 1080 includes a stator 1 and a stator case 500. A disc brake 1110 that generates a braking force for braking a wheel is attached to the electric wheel 1000. The electric wheel 1000 is attached to a frame (vehicle body frame) constituting a vehicle body via a suspension device 1120. The rotary electrical machine 100 of the present example has improved the reliability and the cooling performance, thus, being suitable to be used for the electric wheel 1000 and used as a high-output xEV drive motor.

In the present example, the outer rotor type electric wheel 1000 has been exemplified, but the rotary electrical machine 100 according to the present invention may be applied to an inner rotor type electric wheel.

In addition, the present invention is not limited to the above-described examples and includes various modification examples. For example, the above-described examples have been described in detail in order to describe the present invention in an easy-to-understand manner and are not necessarily limited to those having all the configurations. In addition, a part of a configuration of a certain example may be replaced with a configuration of another example, or a configuration of a certain example may be added to a configuration of another certain example. In addition, it is also possible to add, remove, and replace another configuration to, from, and with some of the configurations of the examples.

REFERENCE SIGNS LIST 1 stator
2 rotor 3 air gap
4 permanent magnet
5 shaft
6 bearing
7 housing
8 first annular flow channel
9 second annular flow channel
10 first coil end
11 second coil end
12 connection wire
13 jumper wire
14 cooling jacket
15 refrigerant inflow port
16 refrigerant outflow port
17 stator core
18 relay flow channel
19 winding coil
20 connection portion
21 baffle plate

The invention claimed is:

1. A rotary electrical machine comprising:
a rotor;
a stator facing the rotor via a predetermined air gap; and
a flow channel through which a refrigerant for cooling the rotor and the stator flows, wherein
the stator has a stator core having a plurality of slots in a circumferential direction, a plurality of coils arranged in the slots in the circumferential direction of the stator core, and at least one of a connection wire connecting an external device and the coils and a jumper wire connecting the coils adjacent to each other in the circumferential direction,
the coils have a first coil end projecting from the slot on one end side in an axial direction of the stator core and a second coil end projecting from the slot on the other end side of the stator core in the axial direction,
the flow channel has a refrigerant inflow port disposed on a side of the first coil end, a first annular flow channel that extends in the circumferential direction in communication with the refrigerant inflow port and faces the air gap in an axial direction, a relay flow channel that is disposed on a side of the second coil end and faces the air gap in the axial direction, and a second annular flow channel that extends in the circumferential direction in communication with the relay flow channel and is disposed to be shifted outward in a radial direction with respect to the air gap,
the connection wire or the jumper wire included in the coil is disposed in the first annular flow channel,
a cooling jacket which encloses the stator on an outer circumference of the stator and in which a refrigerant flow channel is formed,
a refrigerant inlet to the second annular flow channel is provided at one location in the circumferential direction,
an inlet of the refrigerant flow channel formed in the cooling jacket is provided on a radially opposite side of the refrigerant inlet to the second annular flow channel with a rotary shaft of the rotor interposed between the inlet and the refrigerant inlet, and
a flow channel is formed to allow a refrigerant that has flowed into the second annular flow channel to flow halfway through the second annular flow channel in the circumferential direction, then flow from the inlet into the refrigerant flow channel of the cooling jacket, and flow outside the rotary electrical machine after flowing halfway through the refrigerant flow channel of the cooling jacket in the circumferential direction.

2. The rotary electrical machine according to claim 1, wherein
the coil includes both the connection wire and the jumper wire, and
the connection wire and the jumper wire are disposed in the first annular flow channel.

3. The rotary electrical machine according to claim 1, wherein the refrigerant flows through the flow channel in order of the refrigerant inflow port, the first annular flow channel, the air gap, the relay flow channel, and the second annular flow channel to cool the rotor and the stator.

4. The rotary electrical machine according to claim 1, wherein the first annular flow channel and the relay flow channel face the air gap in the axial direction on an entire circumference of the air gap and are connected to the air gap.

5. The rotary electrical machine according to claim 1, further comprising a baffle plate configured to deflect a flow of the refrigerant in the circumferential direction at an outlet portion of the refrigerant inflow port to the first annular flow channel.

6. The rotary electrical machine according to claim 1, wherein a plurality of the refrigerant inflow ports are arranged in the circumferential direction.

7. An electric wheel that has a wheel, a power converter, and a rotary electrical machine including a stator and a rotor, in which the stator is provided on a side of the wheel or a side of a suspension device that attaches the electric wheel to a vehicle body frame, the electric wheel comprising as the rotary electrical machine, the rotary electrical machine according to claim 1.

* * * * *